United States Patent
Johns et al.

(10) Patent No.: US 7,765,948 B2
(45) Date of Patent: Aug. 3, 2010

(54) DEVICE AND METHOD FOR IDENTIFYING THE ROW NUMBER ON A TUBESHEET

(75) Inventors: Clifford L. Johns, Louisville, KY (US); Guillermo Camoriano, Louisville, KY (US); Munaf Najmuddin Chasmawala, Louisville, KY (US); Manfred Schmidt, Louisville, KY (US); Samuel Richard Gates, Louisville, KY (US); Wayne Howard Franklin, Louisville, KY (US)

(73) Assignee: TubeMaster, Inc., Louisville, KY (US)

( * ) Notice: Subject to any disclaimer, the term of this patent is extended or adjusted under 35 U.S.C. 154(b) by 114 days.

(21) Appl. No.: 12/182,487

(22) Filed: Jul. 30, 2008

(65) Prior Publication Data

US 2009/0038773 A1 Feb. 12, 2009

Related U.S. Application Data

(60) Provisional application No. 60/954,390, filed on Aug. 7, 2007.

(51) Int. Cl.
*G09F 9/00* (2006.01)
*B60H 1/00* (2006.01)

(52) U.S. Cl. .................. 116/321; 116/209; 116/307; 165/11.1; 40/914

(58) Field of Classification Search ............. 116/200, 116/201, 204, 209, 278, 280, 306, 307, 321–326, 116/DIG. 1, DIG. 17, DIG. 3; 40/124.04, 40/124.05, 316, 661.01, 661.03, 666, 600, 40/606.03, 607.15, 914, 607.14; 165/11.1
See application file for complete search history.

(56) References Cited

U.S. PATENT DOCUMENTS

| | | | |
|---|---|---|---|
| 4,575,930 A * | 3/1986 | Blickenderfer | 29/723 |
| 4,578,991 A | 4/1986 | Nowlin | |
| 4,677,780 A * | 7/1987 | Shuman | 40/600 |
| 4,696,784 A * | 9/1987 | Tolino et al. | 376/245 |
| 5,344,250 A * | 9/1994 | Kringel et al. | 403/228 |
| 5,477,023 A * | 12/1995 | Schneider et al. | 219/121.68 |
| 6,981,404 B2 | 1/2006 | Johns et al. | |
| 2004/0035029 A1* | 2/2004 | Forsberg | 40/316 |
| 2006/0048418 A1* | 3/2006 | Boire et al. | 40/316 |
| 2009/0095211 A1* | 4/2009 | Johns et al. | 116/201 |

FOREIGN PATENT DOCUMENTS

GB 2247904 3/1992

* cited by examiner

*Primary Examiner*—Amy Cohen Johnson
(74) *Attorney, Agent, or Firm*—Camoriano and Associates; Theresa Fritz Camoriano

(57) ABSTRACT

A device and method for identifying the tubes in a tubesheet, including locating a support element along a portion of the tubesheet with at least one means for identifying the location or condition of the adjacent tubes.

18 Claims, 12 Drawing Sheets

US 7,765,948 B2

DEVICE AND METHOD FOR IDENTIFYING THE ROW NUMBER ON A TUBESHEET

This application claims priority from U.S. Provisional Application Ser. No. 60/954,390, filed Aug. 7, 2007.

BACKGROUND

The present invention relates to a device and method for temporarily identifying tube rows on a tubesheet. In a tube and shell heat exchanger, such as a vertical tube chemical reactor, there are situations in which it is helpful to be able to identify the tubes, such as when the tubes are being loaded with catalyst, unloaded, blown down, cleaned, inspected, repaired, or pressure tested. This is usually done by numbering the rows and then numbering the tubes within a row. Workers often identify the rows temporarily by marking the row numbers on the tubesheet with chalk, but this is time consuming, leaves undesirable material on the tubesheet, the markings can be scuffed or erased when walking over them, and there is the possibility of dropping a piece of chalk down one of the tubes, which would be very undesirable. It is also known to number the rows temporarily using paint and ink, which has essentially the same problems as chalk. Rows also can be marked permanently by stamping, welding, etching and adding other welded pieces like nuts, bolts or pins, but such permanent markings often are not present.

SUMMARY

One embodiment of the present invention provides a device and method for temporarily marking the rows of tubes on a tubesheet. A support element is placed along a portion of the tubesheet, and identifying markers or flags are mounted to the support element such that each marker may be aligned with its corresponding row of tubes. The support element may include means for releasably securing it relative to the tubesheet to ensure that the markers remain aligned with their corresponding tube rows. Each marker is sequentially numbered, corresponding to the row number with which it is ultimately aligned, and each marker may also include, if desired, a code, such as a UPC (universal product code) bar code or some other identifying mechanism which can be read by a laser scanner or other reader to automatically indicate the row number.

DESCRIPTION

Figure 1:
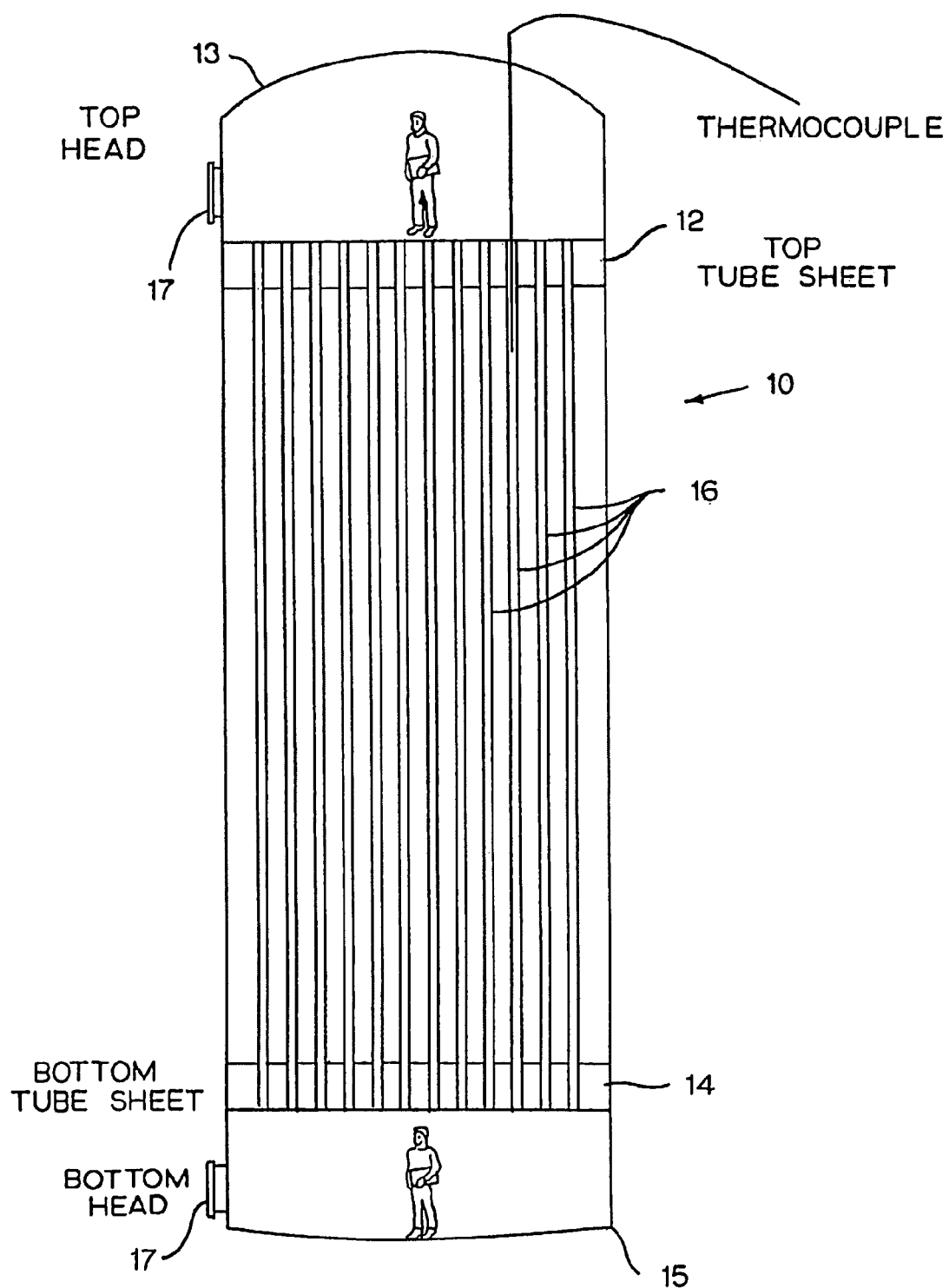
FIG. 1 is a schematic sectional view of a chemical reactor vessel including a shell and a plurality of vertical tubes.
Figure 2:
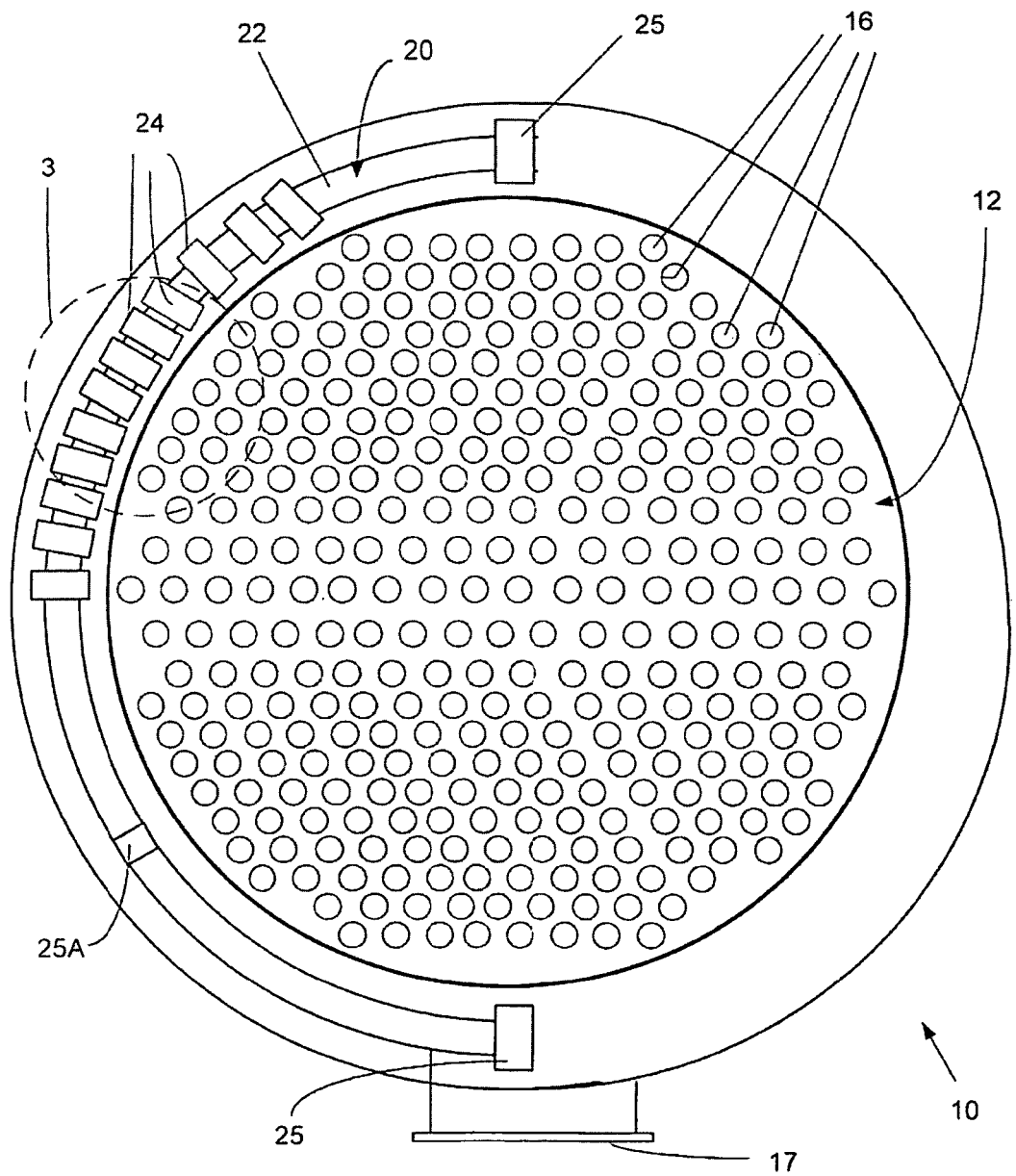
FIG. 2 is a schematic top view of the upper tubesheet of the vessel of FIG. 1, including an embodiment of a tube row marking device.

FIGS. 1 and 2 show a vessel 10, which is a shell and tube heat exchanger, having a top tubesheet 12 and a bottom tubesheet 14 with many tubes 16 welded or expanded to the tubesheets 12, 14 in a triangular pitch arrangement, to form a tightly packed tube bundle. There may be many hundreds or even thousands of tubes 16 extending between the tubesheets 12, 14. The vessel 10 includes a top dome (or top head) 13 and a bottom dome (or bottom head) 15, as well as manways 17 for access to the tubesheets 12, 14 inside the vessel 10. In this case, the shell and tube heat exchanger is a chemical reactor, and the tubes 16 are filled with catalyst pellets, which assist with the chemical reaction. However, similarly-shaped shell and tube vessels may be used for other purposes, such as for a boiler or other heat exchanger. Reactors have either fixed or removable heads. In this embodiment, the heads are fixed.

In many instances, it is desirable to temporarily mark, locate or otherwise identify each row of tubes in the tubesheet 12 to make it easier to identify or locate a specific tube 16 in the tubesheet 12. For example, all the tubes 16 in a vessel 10 may be pressure tested to determine the pressure drop across each tube 16. An excessively high pressure drop may indicate a plugged tube, or, in the case of reactor tubes loaded with catalyst, an excessively low pressure drop may indicate an improperly loaded tube. It is very helpful to be able to quickly and reliably identify the tubes that are being tested in order to know that all the tubes have been properly tested and to locate and identify the "failed" tubes so that the appropriate personnel can quickly zero in on the failed tube(s) for corrective action, such as reloading the catalyst or removing them from service by sealing each end of the tube.

In the instance of removing a tube from service in a reactor vessel, it is typically desirable to seal the tube by welding plugs into both ends of the tube (that is, at both the upper and the lower tubesheets 12, 14), in which case it is advantageous to have a means to quickly locate and reliably mark or identify all the rows in a tubesheet for both the upper and lower tubesheets 12, 14.

Figure 3:
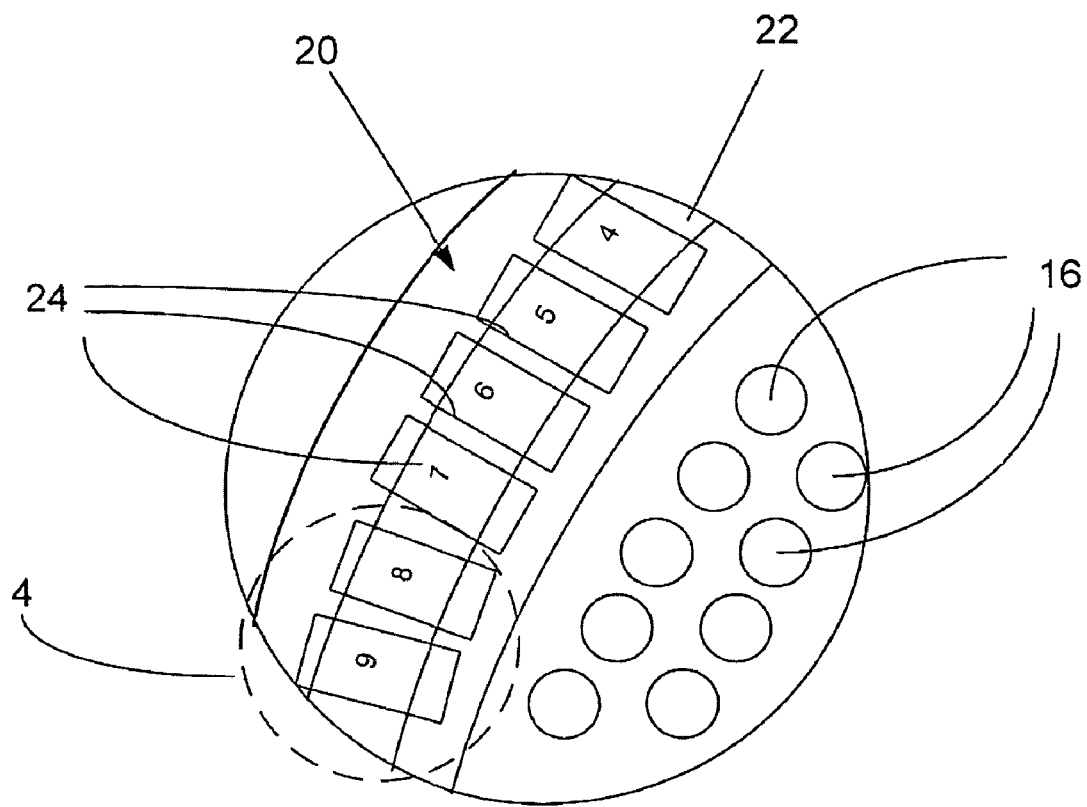
FIG. 3 is an enlarged, detail schematic view of the tube row marking device of FIG. 2.
Figure 4:
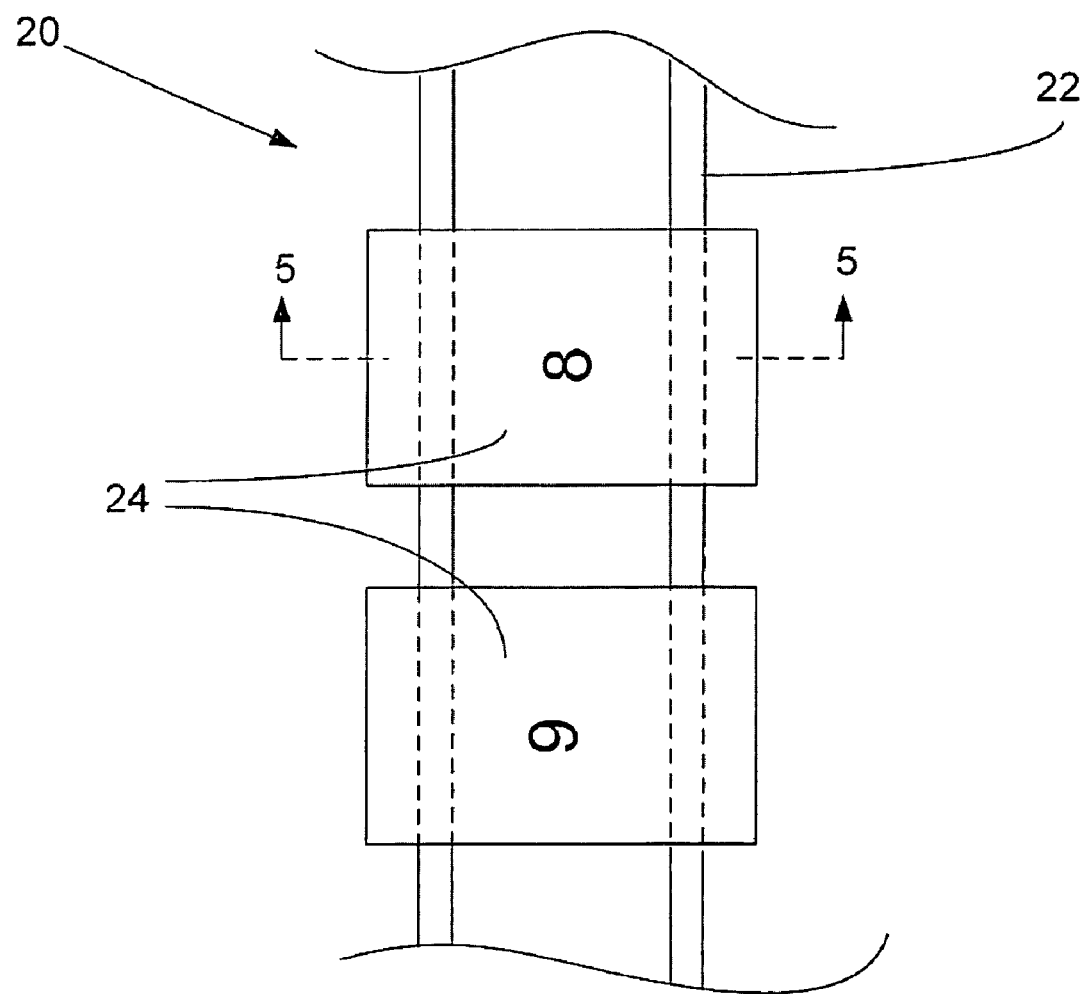
FIG. 4 is an enlarged, top view of a portion of the tube row marking device of FIG. 3.
Figure 5:
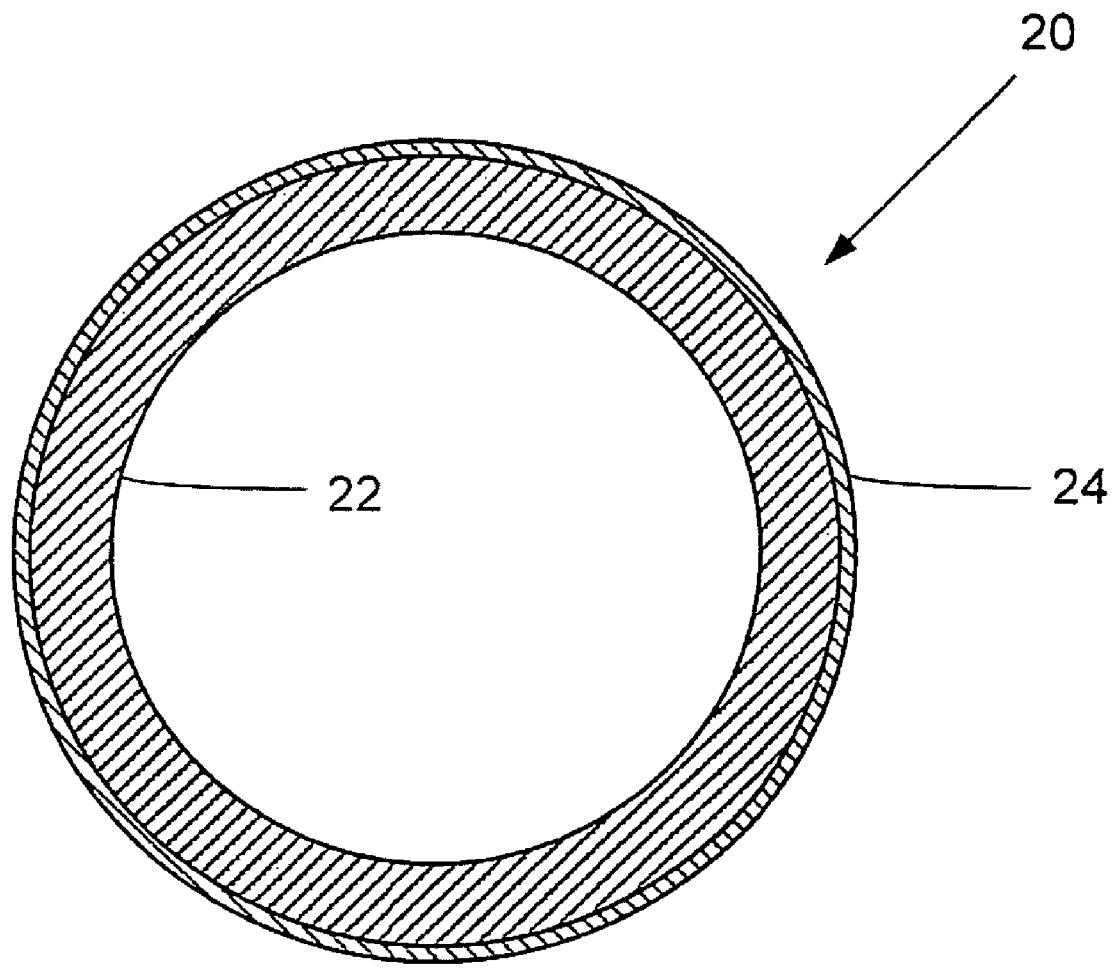
FIG. 5 is a sectional view along line 5-5 of FIG. 4.

FIGS. 2-5 show a first embodiment of a tube row marking device 20. Referring briefly to FIGS. 4 and 5, the tube row marking device 20 includes a flexible support element 22 which, in this embodiment 20, is a piece of pipe. In this particular embodiment, the pipe 22 is a 10 foot (3 meter) long piece of flexible PVC pipe or a highly flexible PEX pipe (PEX is an acronym for cross-linked polyethylene, and is a trademark name belonging to Wirsbo North America located in Apple Valley, Minn.). The tube row marking device 20 also includes a plurality of short rings 24, typically not more than ¾ inches (19 mm) long. In this embodiment 20, the rings 24 are made from clear vinyl tubing cut to the desired length.

Typical combinations of PEX pipe and vinyl tubing may be ½" inside diameter PEX pipe (having a ⅝" outside diameter) combined with ⅝" inside diameter vinyl tubing (having a ¾"

outside diameter); or ⅜" inside diameter PEX pipe (having a ½" outside diameter combined with ½" inside diameter vinyl tubing (having a ⅝" outside diameter). The above combinations result in a plurality of clear vinyl rings 24 concentrically mounted on the PEX pipe 22 wherein the rings 24 fit tightly enough onto the pipe 22 to resist accidentally sliding longitudinally along the pipe (the support element) 22 but may be pushed longitudinally along the pipe 22 to intentionally relocate the rings 24 relative to the pipe (support element) 22, if so desired. The inside diameter of the rings 24 is almost exactly the same as the outside diameter of the support element 22, resulting in a tight but slidable frictional fit between them. The clear vinyl rings 24 have a naturally tacky property, which helps them adhere to the flexible pipe 22. Pulling on the rings 24 actually lengthens them slightly, resulting in a corresponding reduction of the inside diameter, which prevents any sliding of the ring 24 along the pipe 22. However, if a ring 24 is pushed gently (instead of pulled), the ring 24 shortens slightly, resulting in a corresponding increase of its inside diameter, allowing the ring 24 to slide along the pipe 22 to a new location, as desired.

As shown in FIGS. 3 and 4, the clear vinyl rings 24 are labeled with identifiers, which, in this case are numbers, which will eventually correspond to the row number aligned with each ring 24. (While numbers are preferred, other identifiers, such as letters or combinations of numbers and letters, as is often used to designate specific areas or zones of the reactor tubesheets, or other symbols, could be used instead.) The numbers may be marked directly onto the surface of the vinyl rings 24 using a marker or ink or paint, or labels may be printed onto a piece of material such as paper, film or other commercially available marking system (using a labeler, for instance) and these labels may then be secured onto the surface of the rings 24, such as by gluing or taping.

The support element 22 preferably is either very flexible, so it can be coiled up for transportation, or it is supplied in lengths which are short enough to be easily transported. Typically, ten foot (or 3 meter) lengths may be handled readily. Even though FIG. 2 depicts a tube row marking device 20 extending substantially along one half of the circumference of the tubesheet 12, the tube row marking device 20 may extend substantially fully around the entire circumference of the tubesheet 12 or any portion thereof. Also, the tube row marking device 20 may have a single, continuous support element 22, or this support element 22 may be made up of two or more shorter segments, which may be kept separate from each other or may be joined together by suitable means, if desired. For instance, a short dowel (not shown) may be used to splice two support elements 22 by partially inserting a first end of the dowel into one end of a first support element 22 and the second end of the dowel into one end of a second support element 22. Pins may extend through the support elements 22 and dowel ends to secure them together, if desired.

To use the tube row marking device 20, a support element 22 is first preloaded with a plurality of sequentially identified rings 24, equal in number to the corresponding rows to be labeled in the tubesheet 12. The support element 22 or combination of several support elements arranged end-to-end preferably is long enough to span substantially at least one half of the circumference or perimeter of the tubesheet 12, as shown in FIG. 2. However, multiple support elements 22 may be used, with each support element 22 having enough rings 24 to identify the rows along which that particular support element 22 extends. The support element 22 is placed along the perimeter of the tubesheet 12, and the rings 24 are then moved along the length of the support element 22 until each numbered (or otherwise identified) ring 24 is aligned with its corresponding row of tubes.

The marking device 20 may then be releasably secured to the tubesheet 12 (or to the vessel 10) to ensure that the rings 24 remain aligned with their corresponding tube rows despite any accidental forces that may be exerted on the tube row marking device 20 (such as an accidental kick by a worker in the reactor).

Since the tubesheet 12 and/or the vessel 10 typically have ferromagnetic properties, this tube row marking device 20 may be releasably secured to the tubesheet 12 or the vessel 10 by using the external magnets 25 that are attached to the ends of the support element 22 and the internal magnets 25A that are located at intermediate locations along its length. In this embodiment, the intermediate magnets 25A are located inside the hollow support element 22 so they do not interfere with the movement of the rings 24, and the end magnets 25 are large enough to serve as stops to prevent the rings 24 from falling off the ends of the support element 22. The internal magnets 25A have a solid cylindrical shape and are sized to fit snugly within the support element 22, and the external magnets 25 have a hollow cylindrical shape with an inside diameter that allows them to fit snugly over the ends of the support element 22. The magnets 25, 25A may be glued, pinned, or otherwise secured in place, if desired, or their snug fit may be sufficient to keep them in position.

Other means for releasably securing the tube row marking device 20 may be used instead of or in addition to magnets, such as using tape to tape the tube row marking device 20 to the tubesheet 12 or vessel 10, for instance. While FIG. 2 shows the tube row marking device 20 being secured to the top surface of the upper tubesheet 12, it should also be noted that it may be secured in a similar manner to the bottom surface of the lower tubesheet 14.

It should be noted that one may wish to number (mark) only every other row of tubes or every fifth or every tenth row of tubes, instead of marking every row. In that case, fewer rings 24 would be used, and there would be less crowding of the rings 24 along the support element 22. Also, in that case, instead of using a sequence of numbers such as 1, 2, 3, 4, . . . on the rings 24, the arrangement preferably would use regularly spaced-apart numbers corresponding to the rows that are being identified, such as 2, 4, 6, 8, . . . or 5, 10, 15, 20 . . . , and so forth. The numbering also can be done in different colors to aid in locating a range of numbers such as by making every tenth or fifth identifier or other group or grouping of a different color.

It should also be noted that, once the rings 24 have been arranged along the length of the support element 22 so the rings 24 align with their respective tube rows, the tube row marking device 20 may be removed from the vessel 10 via the manway 17, and additional tube row marking devices 20 may be prepared using the first tube row marking device 20 as a master template to indicate the correct placement and spacing of the rings 24 along the support element 22. Then all the tube row marking devices 20 that have been prepared may be used to mark the tube rows on both halves of the tubesheet 12 (the right side as shown in FIG. 2), or on additional portions of the same half of the tubesheet 12, and they may also be used to mark one or both halves of the bottom tubesheet 14, to aid in the rapid identification of both ends of a particular tube in both tubesheets 12, 14. This is especially useful for chemical plants with multiple reactors that are being serviced at the same time and which are all identical in terms of row numbering and spacing.

Once the activities that involved identifying the rows, such as loading, unloading, inspection, cleaning, repairs, tube testing or blowdown, are completed, the row marking devices 20 are removed, leaving no trace behind that might hinder the operation of the reactor or heat exchanger.

Alternate Embodiments

Figure 6:
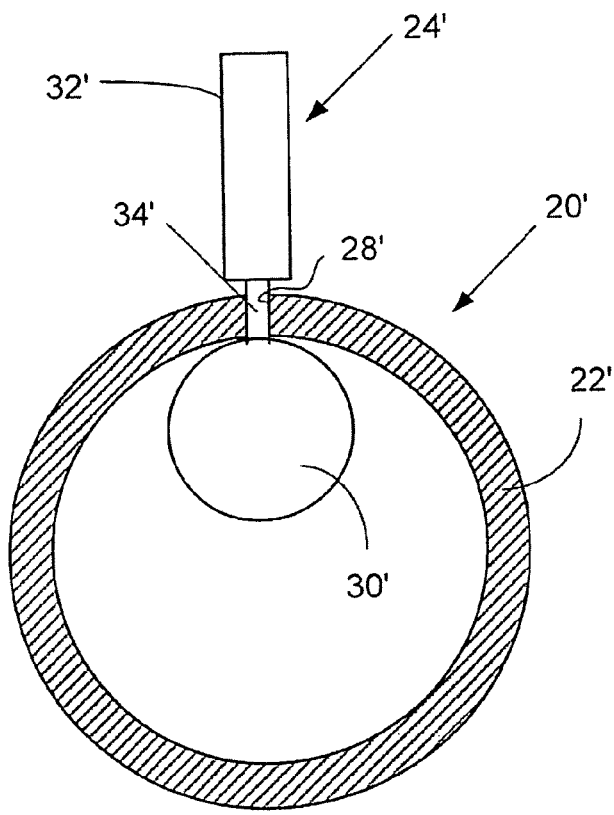
FIG. 6 is a sectional view similar to that of FIG. 5, but for another embodiment of a tube row marking device.

FIG. 6 is a section view, similar to that of FIG. 5, but for an alternate embodiment of a tube row marking device 20'. In this instance, the support element 22' again is a flexible pipe, such as a flexible PVC pipe or a PEX pipe, similar to the support element 22 of FIG. 5, except that the straight, unflexed pipe is cut linearly lengthwise along all or substantially all of its length, to form a slotted opening 28'. Instead of clear vinyl rings 24, this tube row marking device 20' includes a plurality of markers 24' as described below.

Figure 7:
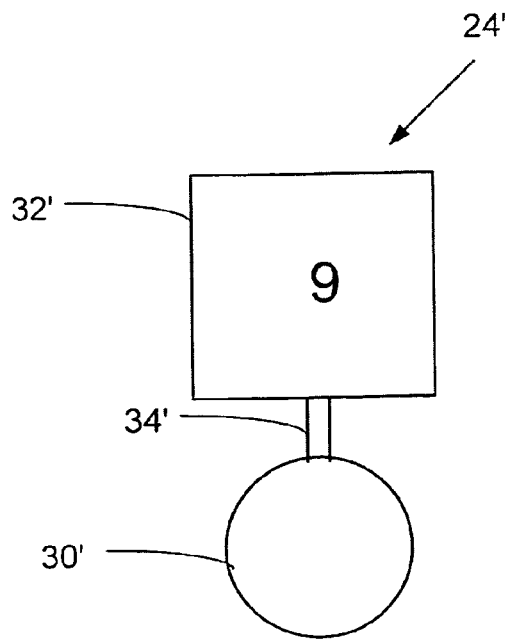
FIG. 7 is a side view of the flag of FIG. 6.

FIG. 7 is a side view of one of the markers 24' of FIG. 6. The marker 24' includes an inner enlargement 30' (which, in this instance is a sphere 30'), an enlarged flag 32' (which, in this instance is a flat, rectangular flag 32'), and a narrower stem 34' which joins the enlargement 30' and the flag 32' and extends through the slot 28'. The stem 34' preferably has a circular cross-sectional profile with a diameter which is slightly larger than the resting width of the slot 28' of the support element 22'. The stem 34' extends through the slot 28', connecting together the inner enlargement 30' lying inside the hollow interior of the support element 22' and the flag 32' lying outside the support element 22'. The support element 22' flexes slightly to enlarge the slot 28' in order to accommodate the stems 34' of the markers 24'. The support element 22' has elastic properties and wants to return to its original "at rest" shape, so the two sides of the support element 22' that form the slot 28' press against the stems 34' of the markers 24', providing a frictional resistance to keep the markers 24' in place once they have been positioned along the support element 22', in alignment with their corresponding tube rows.

Each marker 24' may be slid longitudinally along the support element 22', with the enlargement 30' preventing the marker 24' from pulling out of the support element 22', and with the flag 32' keeping the marker 24' from falling inside the support element 22'.

The flat portion of the flag 32', as represented by the numeral "9" in FIG. 7, may be grasped in order to rotate the marker 24' relative to the support element 22' to bring this flat portion of the flag 32' into a position that is substantially perpendicular to its corresponding tube row. If desired, the indicator on the flag 32' (in this case the number 9) may be supplemented by, or replaced with, a device readable code, such as a UPC bar code (not shown) which may be read directly by a device such as a laser scanner, aligned with the respective tube row. In this manner, a device can be used to automatically read the bar code on the flag 32' to identify the tube row and to measure the distance from a particular tube 16 in the tubesheet 12 to the flag 32', which enables the device to identify the tube number within that tube row. By automatically identifying the row and tube number, the device can automatically and uniquely identify a specific tube 16 within the tubesheet 12.

This tube row marking device 20' is used in substantially the same manner as the tube row marking device 20 described earlier. The support element 22' may be releasably secured to the tubesheet 12 or the vessel 10 as described for the previous tube row marking device 20. The main feature of this tube row marking device 20' is that, because the upwardly projecting flag 32' may rotate to align the flat face of the flag 32' with its corresponding tube row, it facilitates the automatic reading of the tube row by an automatic reader or scanner device. Of course, when this tube row marking device 20' is located on the bottom surface of the lower tubesheet 14, the flags 32' will project downwardly.

The device shown and described in U.S. Pat. No. 6,981, 404, which is hereby incorporated herein by reference, may be modified to add a bar code scanner adjacent to the laser measuring device. Then, the operator would simply push a button, which would cause the central processor to command the bar code scanner to read the bar code on the flag 32' and transmit that information to the central processor to identify automatically the row being measured, and would cause the central processor to command the laser measuring device to measure the distance to the flag and transmit that information to the central processor, which would use that information to identify automatically which tubes are being measured. That information then would be recorded and displayed as described in that patent.

Figure 8:
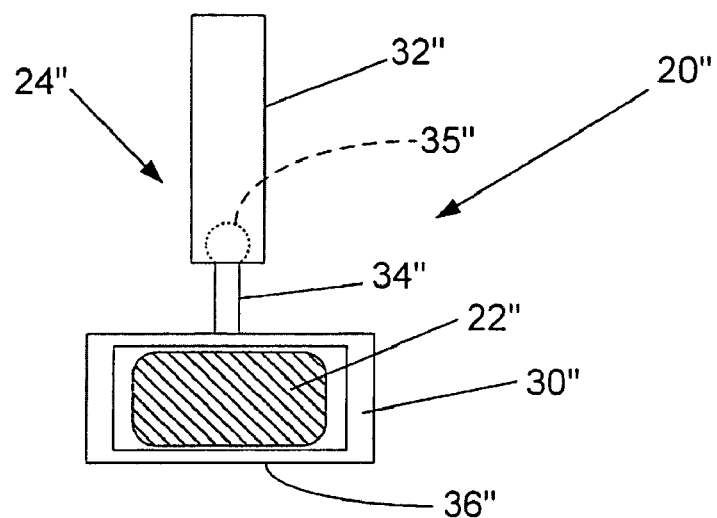
FIG. 8 is a sectional view similar to that of FIG. 5, but for another embodiment of a tube row marking device.

FIG. 8 is a sectional view, similar to that of FIG. 5, but for yet another embodiment of a tube row marking device 20". In this instance, the support element 22" is a flexible magnetic strip, similar to the magnetic strips widely used in refrigerator door gaskets. Instead of clear vinyl rings 24, this tube row marking device 20" includes a plurality of markers 24" as described below.

Figure 9:
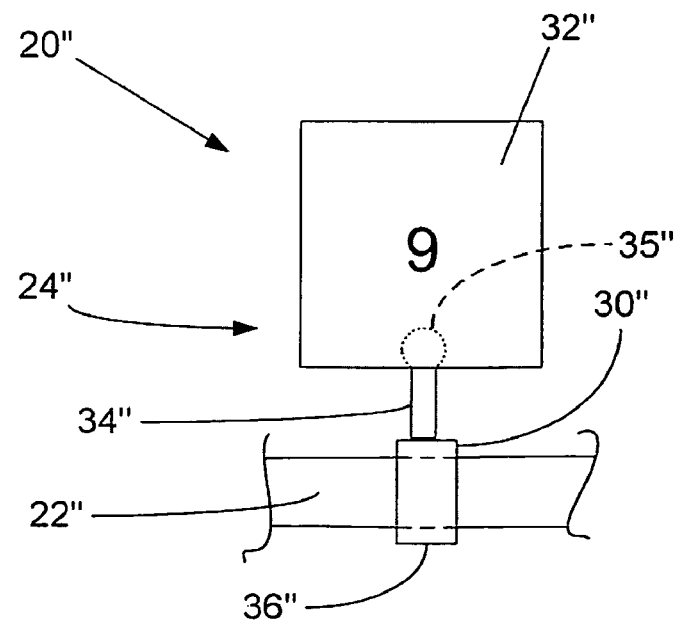
FIG. 9 is a side view of the tube row marking device of FIG. 8.

FIG. 9 is a side view of the marker 24" of FIG. 8. The marker 24" includes a rectangular ring portion 30", a flag portion 32" (which, in this instance is a flat, rectangular flag 32"), and a stem portion 34", which joins the rectangular ring portion 30" and the flag 32". The stem portion 34" has a spherical head 35" which is snap fit into a similarly-shaped recess in the flag 32". This enables the flag 32" to rotate about the axis defined by the stem 34", enabling the flag 32" to be substantially perpendicularly aligned with its corresponding tube row in a similar manner as described above for the tube row marking device 20'.

The rectangular ring portion 30" is sized to receive the support element 22" and preferably at least some part of the ring 30", such as the bottom portion 36", is made from a ferromagnetic material such that at least that part of the rectangular ring portion 30" is magnetically attracted to the support element 22", so the magnetic force keeps the markers 24" in place once they have been positioned along the support element 22", in alignment with their corresponding tube rows.

The markers 24" may be slid longitudinally along the support element 22", with the rectangular ring portion 30" retaining the marker 24" on the support element 22".

As was the case with the tube row marking device 20' described above, the flat portion of the flag 32", as represented by the numeral "9" in FIG. 9, may be rotated relative to the support element 22" such that this flat portion of the flag 32" may be oriented substantially perpendicular to its corresponding tube row. The numeral or letter or other identifier on the flag 32" may be supplemented by, or replaced with, a code, such as a UPC bar code (not shown) which may be read directly by an automated device, such as by a laser scanner, aligned with the respective tube row. In this manner, an automated device can read the bar code on the flag 32" to identify the row. It also may use the flag 32" as a reflector as described in U.S. Pat. No. 6,725,706, which is hereby incorporated herein by reference, to measure the distance from a particular tube 16 in the tubesheet 12 to the flag 32", so it can automatically identify the row and tube number in order to automatically and uniquely identify each specific tube within the tubesheet 12. Or a separate reflector may be used for measuring the distance as taught in the '706 patent.

This tube row marking device 20" is used in substantially the same manner as the tube row marking device 20' described earlier. The support element 22" is releasably secured to the tubesheet 12 or the vessel 10 by the magnetic attraction between the support element 22" and the tubesheet 12 or the vessel 10. In this tube row marking device 20", the entire support element 22" is a lightweight and flexible magnet which may be laid along the perimeter of the tubesheet 12. The magnet 22" may be readily rolled up for transportation, the rectangular ring portion 30" prevents the accidental dislodging of the markers 24" from the support element 22", and the magnetic attraction between the rectangular ring portion 30" and the support element 22" resists accidental movement of the markers 24" along the support element 22" once they have been aligned with their respective tube rows. Enlarged stops may be located at the ends of the support element 22" if desired, to retain the markers 24" on the support element 22".

Figure 10:
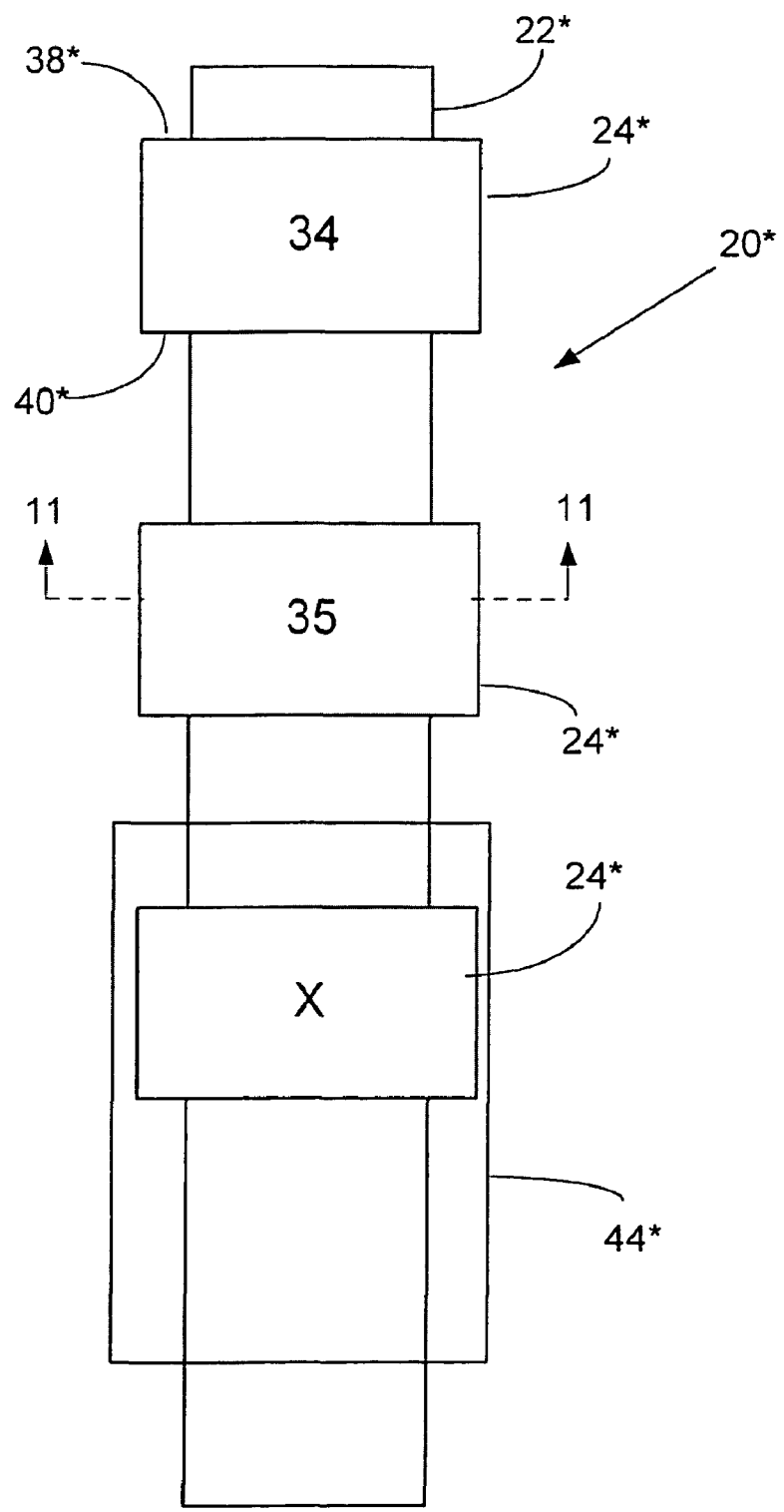
FIG. 10 is a top view similar to that of FIG. 4, but for another embodiment of a tube row marking device.
Figure 11:
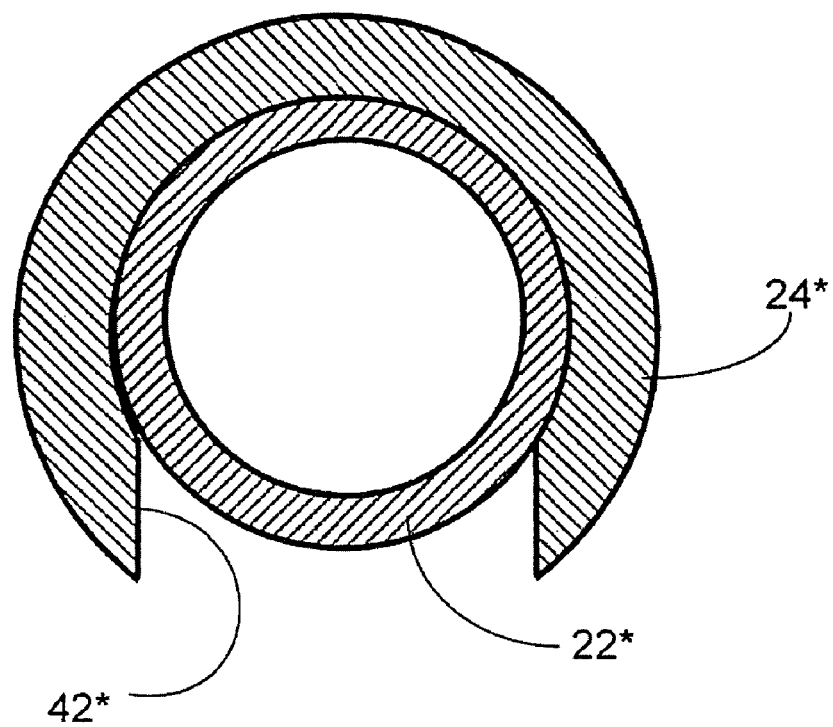
FIG. 11 is a section view along line 11-11 of FIG. 10.
Figure 12:
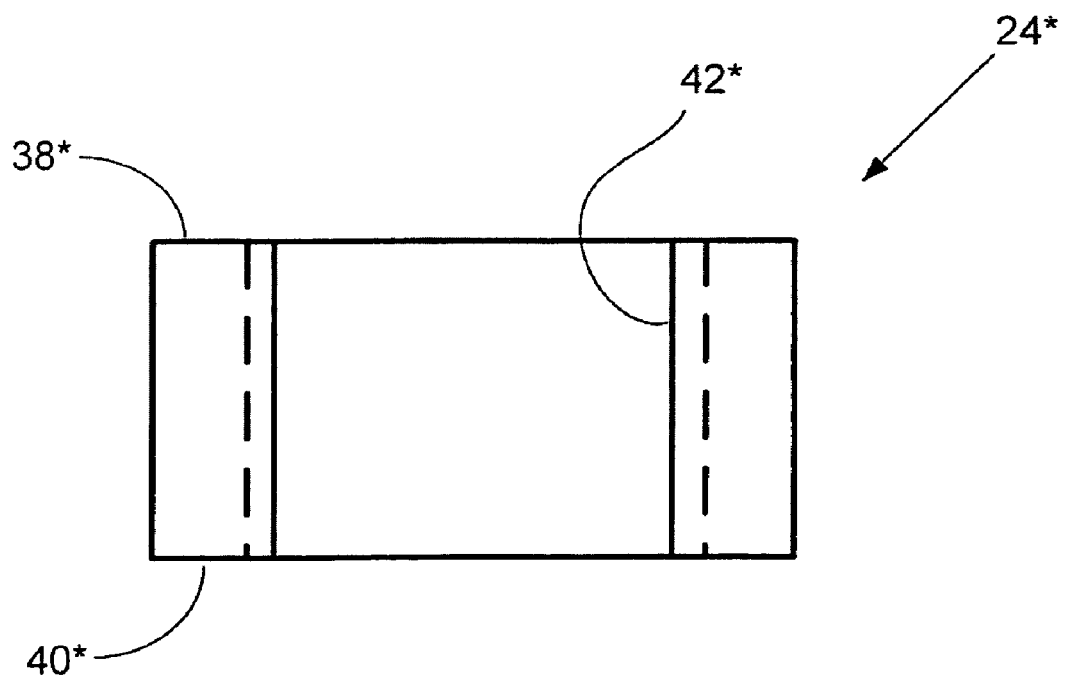
FIG. 12 is a side view of the "C" shaped marker of FIG. 11.

FIGS. 10-12 depict another embodiment of a tube row marking device 20\* which is similar to the tube row marking device 20 of FIG. 4. The support element 22\* is a flexible tubular member, such as a long piece of ½" cpvc pipe, which flexes easily. Other materials, such pvc pipe, aluminum, steel, or wood may be used instead of cpvc, but cpvc exhibits a high degree of flexibility, is economical, and is tough enough to be able to be used repeatedly in the abrasive, dust-laden environment found in and around catalyst changeover operations.

As may be better appreciated in FIGS. 11 and 12, the marker 24\* is a substantially cylindrical element, preferably made out of the same material as the support element 22\*, but considerably shorter in length, preferably on the order of ½" to ¾" long. A portion of the cylindrical wall of the marker 24\* has been removed, such as by cutting lengthwise from one end 38\* to the other end 40\* of the marker 24\*, to form a longitudinal opening 42\*. In a preferred embodiment, this opening 42\* spans approximately ⅓ (or 120 degrees) of the perimeter of the marker 24\*. The marker 24\* is flexible and resilient enough that the opening 42\* may be stretched open far enough to snap the marker 24\* over the support element 22\*. The inside surface of the marker 24\* frictionally engages the outside surface of the support element 22\* to prevent accidental displacement of the marker 24\* along the support element 22\*. However, the frictional engagement between the marker 24\* and the support element 22\* is not so great that it cannot be overcome by purposely pushing the marker 24\* along the support element 22\*, or by unsnapping the marker 24\* from the support element 22\* and repositioning it where desired.

It may be desirable to secure the markers 24\* onto the support element 22\* to ensure that a marker 24\* does not accidentally fall off of the support element 22\*. A simple solution is to wrap each marker 24\* with a clear tape 44\*, such as packaging tape used to seal cardboard cartons, as shown in FIG. 10.

The tube row marking device 20\* is used in much the same manner as has already been discussed for the tube row marking devices described earlier. The support element 22\* may be placed around and near the edge of the perimeter of the upper and lower tubesheets, as depicted in FIG. 2 for an earlier embodiment. The tube row marking device 20\* may be secured in place by temporary fastening means, such as by magnets or tape.

Sometimes, especially for larger tubesheets, it may be desirable to use a tube row marking device to identify the rows along the middle of the tubesheet. Due to the triangular pitch of the tubes 16 in the tubesheet 12, the rows can be marked by locating a straight tube row marking device 20\* at an angle extending along the tubes 16, as depicted in FIG. 13.

Figure 13:
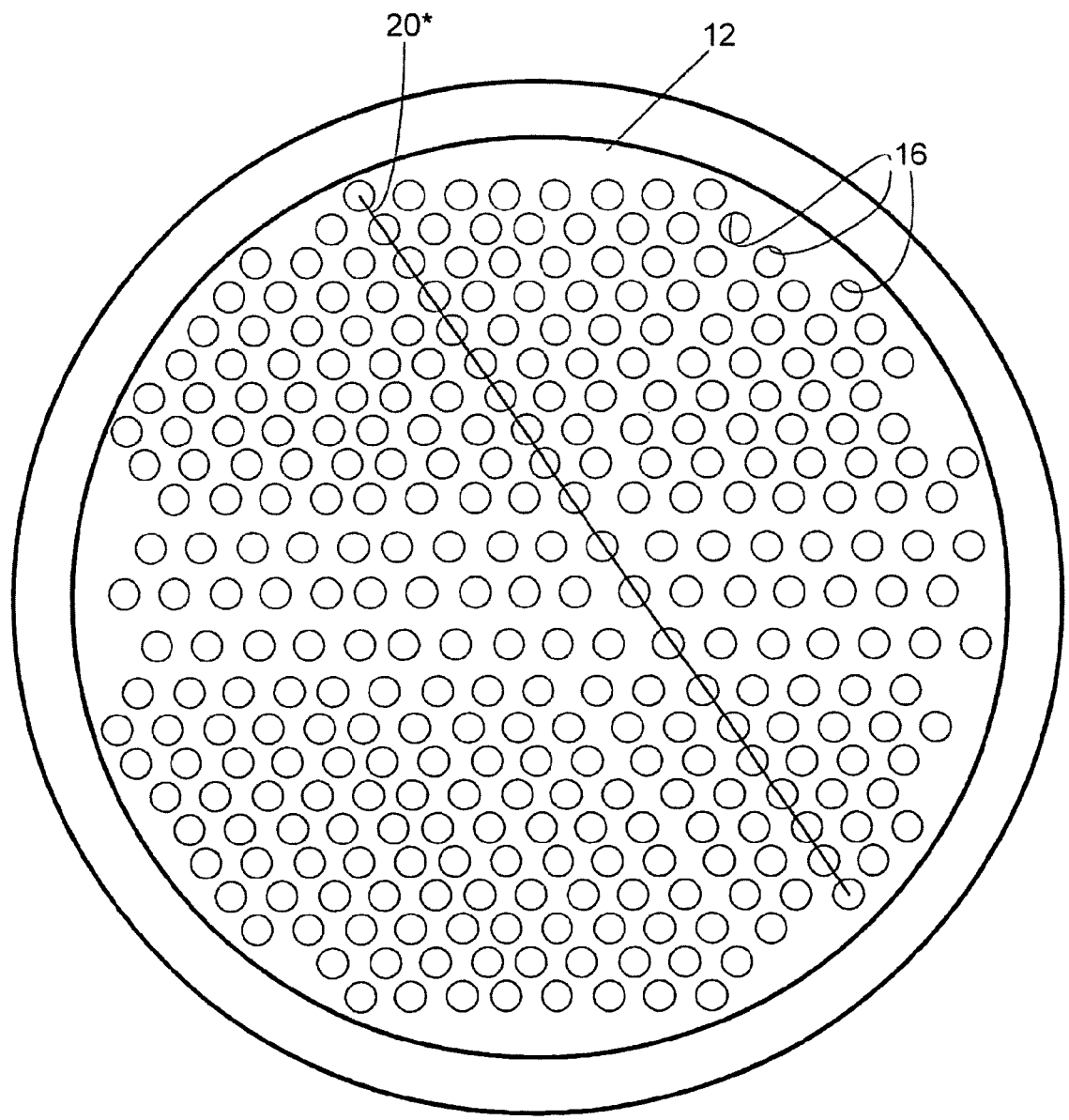
FIG. 13 is a schematic top view of a tubesheet, similar to that of FIG. 2, but showing an alternate method of using a tube row marking device.

While FIG. 13 shows use of the marking device 20\*, any of the other embodiments of tube row marking devices described above may be used in this manner.

Figure 14:
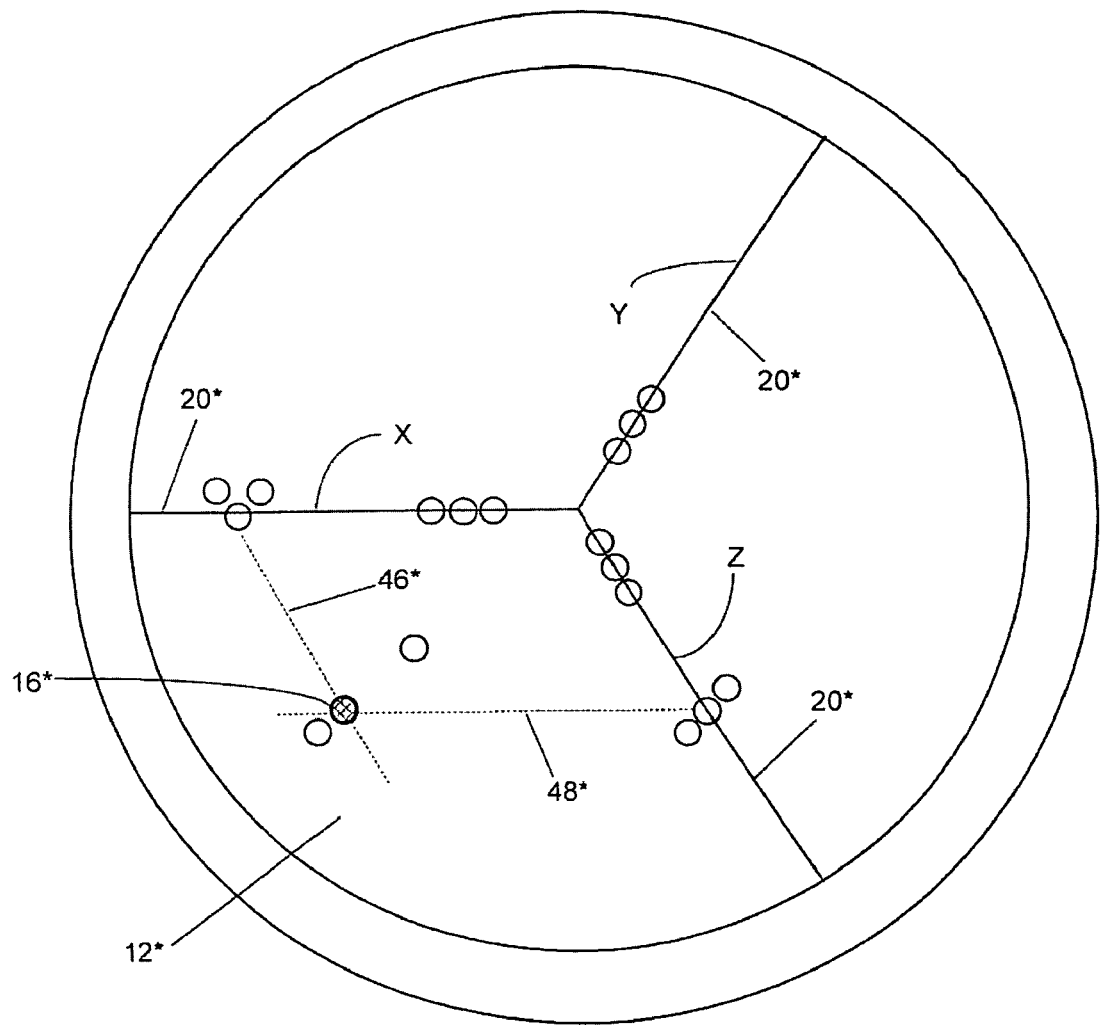
FIG. 14 is a schematic top view of a tubesheet, similar to that of FIG. 13 with most of the tubes deleted for clarity, showing yet another alternate installation of a tube row marking device.

Some tubesheets are divided into sectors, such as the tubesheet 12\* with three sectors depicted in FIG. 14. For such a tubesheet 12\*, the particular tube is identified by naming the coordinates which intersect its position. For instance, for the crosshatched tube 16\* in the bottom left sector, the intersection of its "X" axis row and its "Z" axis row (this intersection is schematically depicted by the dotted lines) defines its position within the tubesheet 12\*. Any of the tube row marking devices disclosed herein (such as the tube row marking device 20\* as shown in FIG. 14) may be used to mark the rows within the axes so as to facilitate the identification of the tubes within the tubesheet 12\*. For the example shown in FIG. 14, once the "X" axis row and the "Z" axis row are identified by using the tube row marking devices 20\*, two straight-edges 46\*, 48\* may be placed along the corresponding rows to zero in on the particular tube 16\*.

It may also be desirable to mark a range of row numbers, or a cluster of tubes that have a special condition such as sludge on the outside (or shell side) of the tube, corrosion or other damage to the tube, or other conditions, which can require custom loading, special monitoring, or other actions unique to the specific problem. It is very desirable to have a simple way to mark these groups of tubes.

Figure 15:
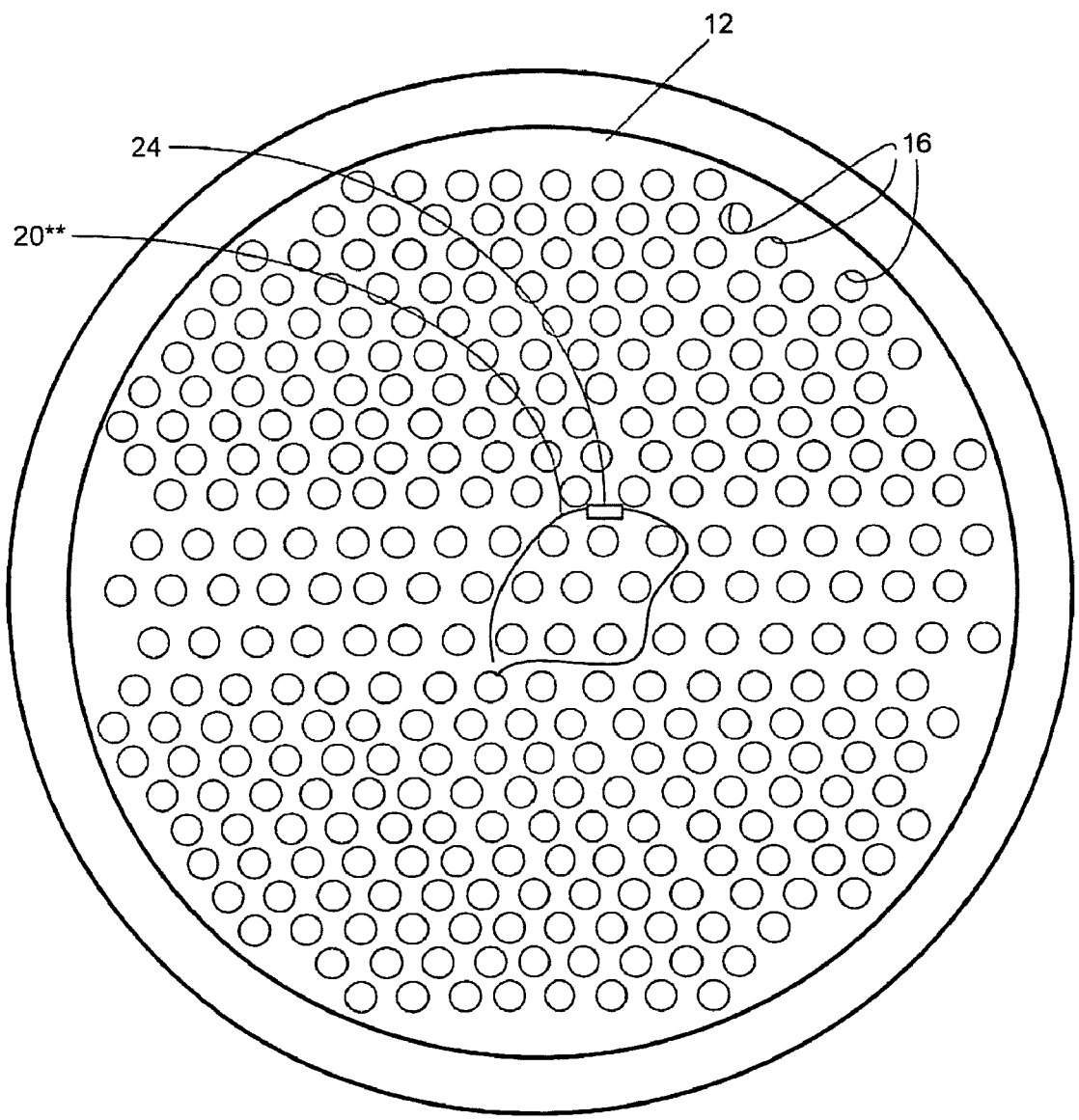
FIG. 15 is a schematic top view of a tubesheet, similar to that of FIG. 13, showing yet another alternate installation of a tube row marking device.

FIG. 15 depicts a tube row marking device **20\*\* which is particularly suited for this application where it is desirable to mark a cluster of tubes within a tubesheet. Any of the aforementioned tube row marking devices may be used for this application, but a very flexible or malleable support element is preferred. In this case, the marking device 20\* simply encircles the group of tubes needing special identification and marking. In this instance, the plurality of slidable markers (such as the markers 24 of FIG. 2) may be eliminated entirely or, optionally, only one or a few such markers 24 may be used, as shown in FIG. 15** and as explained in more detail below.

The marker(s) 24 may use characters or markings other than row numbers to identify the particular condition of the tubes outlined by the tube row marking device 20w. For instance, the marker 24 could be color coded, painted red on one side and green on the other side. When the tube row marking device **20\*\* is first installed around a cluster of tubes, the red side of the marker 24** may be showing, indicating that no special or corrective action has been taken on that cluster of tubes. After corrective action has been taken, the marker may be rotated so that the green side shows to indicate that corrective action has been taken.

As indicated above, it is possible to totally eliminate the use of the markers 24 by having, for instance, the support element of the tube row marking device **20\*\* itself be coded. For instance, the tube row marking device 20\*\*** may be a flat magnetic rope with one surface painted red and the other surface painted green. The rope is then laid out so as to delineate the cluster of tubes to be marked, with the red surface of the rope showing to the user. The magnetic property of the rope acts to keep the rope in place on the tubesheet as it encircles the cluster of tubes. After the required activity has taken place on the cluster of tubes, the rope can be flipped over so that the green surface of the rope shows to the user, thus helping track activity on a given cluster of tubes.

While the embodiments described above show several types of support elements as well as several types of relocatable markers mounted to the support elements, various other tube row marking devices could be used without departing from the scope of the present invention. For instance, an inflexible support element conforming to the desired shape may be used. It is also possible to permanently affix the markers to the support element, or to an integral part of the support element, once they are in their desired positions, such as by gluing the markers to the support element. This would limit the applicability of that tube row marking device to the particular tube spacing of a particular tubesheet, but would otherwise result in no loss in performance. It will be obvious to those skilled in the art that various modifications may be made to the embodiments described above without departing from the scope of the present invention as claimed.

What is claimed is:

1. A method for identifying the tubes in a tubesheet, comprising the steps of:
    magnetically securing an elongated support element along at least a portion of the tubesheet adjacent a plurality of tubes to be identified; and
    providing at least one means on said elongated support element for identifying the condition or location of the adjacent tubes.

2. A method for identifying the tubes in a tubesheet as recited in claim 1, wherein said at least one means is a plurality of slidable markers including unique identifiers that are aligned with and identify the respective rows.

3. A method for identifying the tubes in a tubesheet as recited in claim 2, wherein said support element has a longitudinal direction, and further comprising the step of moving the markers longitudinally along the support element to align them with their respective rows.

4. A method for identifying the tube rows in a tubesheet as recited in claim 3, wherein said support element is a flexible element, and further comprising the step of flexing said support element to conform to the shape of the perimeter of the tubesheet.

5. A method for identifying the tubes in a tubesheet as recited in claim 1, including the step of flexing the support element and securing the support element in a position on the tube sheet in which it surrounds a group of tubes to be specially identified.

6. An arrangement for identifying the tube rows in a tubesheet, comprising:
    a tubesheet, including a plurality of tubes arranged in rows:
    an elongated support element having a longitudinal direction and an outer surface, said elongated support element being releasably secured to the tubesheet; and
    a plurality of markers slidably secured to said support element, said markers including unique identifiers corresponding to respective rows in the tubesheet.

7. An arrangement for identifying the tube rows in a tubesheet as recited in claim 6, and further including means for releasably securing the elongated support element relative to a tubesheet.

8. An arrangement for identifying the tube rows in a tubesheet as recited in claim 6, wherein said support element is a flexible pipe having an outer surface, and said markers are sleeves surrounding at least a portion of said outer surface.

9. An arrangement for identifying the tube rows in a tubesheet as recited in claim 8, wherein each of said sleeves fits snugly over said support element.

10. An arrangement for identifying the tube rows in a tubesheet as recited in claim 9, and further including means for securing the elongated support element to a tubesheet.

11. An arrangement for identifying the tube rows in a tubesheet as recited in claim 10, wherein said means for securing the elongated support element to a tubesheet includes magnets.

12. An arrangement for identifying the tube rows in a tubesheet as recited in claim 6, wherein said support element defines a longitudinally-extending slot, and each of said markers includes a flag portion; an enlarged portion; and a shaft portion extending from said flag portion to said enlarged portion, said shaft portion projecting through said longitudinally-extending slot.

13. An arrangement for identifying the tube rows in a tubesheet as recited in claim 12, wherein said flag portions include said unique identifiers, and further including means for rotating said flag portions relative to said support element in order to orient each flag portion perpendicular to its respective row.

14. An arrangement for identifying the tube rows in a tubesheet as recited in claim 13, wherein said unique identifiers include the row number associated with the location of the corresponding marker.

15. An arrangement for identifying the tube rows in a tubesheet as recited in claim 13, wherein said unique identifiers include coded information that identifies the row number associated with the location of the corresponding marker.

16. An arrangement for identifying the tube rows in a tubesheet as recited in claim 15, wherein said coded information is in the form of a Universal Product Code which can be read by a scanner device.

17. An arrangement for identifying the tube rows in a tubesheet as recited in claim 6, wherein said support element is a magnetic strip, and each of said markers defines a flag portion, a ferromagnetic base potion, and a shaft portion extending downwardly from said flag portion to said base portion, wherein said base portion is magnetically secured to said support element for adjustably relocating said markers to said support element.

18. An arrangement for identifying the tube rows in a tubesheet as recited in claim 17, wherein said base portion defines a sleeve surrounding a portion of the outer surface of said support element and wherein said shaft portion is rotatably mounted to said base portion to facilitate the alignment of said flag portion to its respective row.

* * * * *

UNITED STATES PATENT AND TRADEMARK OFFICE
CERTIFICATE OF CORRECTION

PATENT NO. : 7,765,948 B2  Page 1 of 1
APPLICATION NO. : 12/182487
DATED : August 3, 2010
INVENTOR(S) : Clifford L. Johns et al.

It is certified that error appears in the above-identified patent and that said Letters Patent is hereby corrected as shown below:

Column 8, line 40, delete "20w" and insert therefor --20**--.
Claim 17, line 41, following the words ferromagnetic base, delete "potion" and insert therefor --portion--.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,765,948 B2 | Page 1 of 1 |
| APPLICATION NO. | : 12/182487 | |
| DATED | : August 3, 2010 | |
| INVENTOR(S) | : Clifford L. Johns et al. | |

It is certified that error appears in the above-identified patent and that said Letters Patent is hereby corrected as shown below:

Column 8, line 40, delete "20w" and insert therefor --20**--.
Claim 17, Column 10, line 41, following the words ferromagnetic base, delete "potion" and insert therefor --portion--.

This certificate supersedes the Certificate of Correction issued September 14, 2010.

Signed and Sealed this

Second Day of November, 2010

David J. Kappos
*Director of the United States Patent and Trademark Office*